(12) United States Patent
Short et al.

(10) Patent No.: US 9,148,573 B2
(45) Date of Patent: Sep. 29, 2015

(54) NON-UNIFORM CORRECTION ILLUMINATION PATTERN

(71) Applicant: HEWLETT-PACKARD DEVELOPMENT COMPANY, L.P., Houston, TX (US)

(72) Inventors: David B Short, San Diego, CA (US); Kurt E Spears, Fort Collins, CO (US); Otto K Sievert, San Diego, CA (US); Kenneth K Smith, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 252 days.

(21) Appl. No.: 13/841,168

(22) Filed: Mar. 15, 2013

(65) Prior Publication Data
US 2014/0267866 A1 Sep. 18, 2014

(51) Int. Cl.
*G03B 21/14* (2006.01)
*G03B 21/13* (2006.01)
*H04N 3/23* (2006.01)
*H04N 5/74* (2006.01)
*H04N 5/232* (2006.01)
*G03B 27/68* (2006.01)
*H04N 5/365* (2011.01)
*G03B 17/54* (2006.01)
*G06F 3/03* (2006.01)
*H04N 5/217* (2011.01)
*H04N 5/225* (2006.01)
*H04N 9/31* (2006.01)

(52) U.S. Cl.
CPC ............ *H04N 5/23293* (2013.01); *G03B 17/54* (2013.01); *G03B 21/13* (2013.01); *G03B 21/147* (2013.01); *G03B 27/68* (2013.01); *G06F 3/0304* (2013.01); *H04N 3/23* (2013.01); *H04N 5/2176* (2013.01); *H04N 5/2256* (2013.01); *H04N 5/3651* (2013.01); *H04N 5/74* (2013.01); *H04N 9/3182* (2013.01); *H04N 9/3194* (2013.01)

(58) Field of Classification Search
CPC ... H04N 5/23293; H04N 3/23; H04N 5/2176; H04N 5/232; H04N 5/74; H04N 5/3651; G03B 21/13; G03B 21/147; G03B 27/68
USPC ............................. 353/30, 69; 348/207.1, 746
See application file for complete search history.

(56) References Cited

U.S. PATENT DOCUMENTS

| | | | |
|---|---|---|---|
| 6,618,076 B1 * | 9/2003 | Sukthankar et al. | 348/180 |
| 7,023,536 B2 | 4/2006 | Zhang et al. | |
| 7,038,846 B2 | 5/2006 | Mandella et al. | |
| 7,088,440 B2 | 8/2006 | Buermann et al. | |
| 7,110,100 B2 | 9/2006 | Buermann et al. | |

(Continued)

OTHER PUBLICATIONS

Gao, Rui et al; Microsoft Research-Mobile Surface; Microsoft Research; 2010; http://research.microsoft.com/en-us/projects/mobilesurface/.

(Continued)

Primary Examiner — Sultan Chowdhury
Assistant Examiner — Magda Cruz
(74) Attorney, Agent, or Firm — Conley Rose

(57) ABSTRACT

An example system in accordance with aspects of the present disclosure includes a controller and a camera communicatively coupled to the controller to capture an image of a work surface. A projector is also provided and is coupled to the controller to project an illumination pattern onto the work surface during image capture by the camera.

19 Claims, 11 Drawing Sheets

(56) References Cited

U.S. PATENT DOCUMENTS

| | | | |
|---|---|---|---|
| 7,113,270 | B2 | 9/2006 | Buermann et al. |
| 7,161,664 | B2 | 1/2007 | Buermann et al. |
| 7,203,384 | B2 | 4/2007 | Carl et al. |
| 7,268,956 | B2 | 9/2007 | Mandella et al. |
| 7,474,809 | B2 | 1/2009 | Carl et al. |
| 7,729,515 | B2 | 6/2010 | Mandella et al. |
| 7,826,641 | B2 | 11/2010 | Mandella et al. |
| 7,961,909 | B2 | 6/2011 | Mandella et al. |
| 2004/0141162 | A1* | 7/2004 | Olbrich .................. 353/119 |
| 2005/0068442 | A1* | 3/2005 | Billington et al. ......... 348/333.1 |
| 2005/0168437 | A1 | 8/2005 | Carl et al. |
| 2005/0180631 | A1* | 8/2005 | Zhang et al. ............. 382/173 |
| 2007/0097333 | A1* | 5/2007 | Zavarehi et al. .............. 353/85 |
| 2007/0262235 | A1 | 11/2007 | Pertsel |
| 2011/0227915 | A1 | 9/2011 | Mandella et al. |
| 2012/0038549 | A1 | 2/2012 | Mandella et al. |
| 2013/0194418 | A1 | 8/2013 | Gonzalez-Banos et al. |

OTHER PUBLICATIONS

Hand, Randall; Infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs.

Harrison, Beverly & Ziola, Ryder; Bringing Toys to Life: Intel Labs OASIS Project; Augmented Engineering; Jan. 26, 2011; http://augmentedengineering.wordpress.com/2011/01/26/bringing-toys-to-life-intel-labs-oasis-project/.

Harrison, Chris et al; OmniTouch: Wearable Multitouch Interaction Everywhere; UIST'11; Oct. 16, 2011; Santa Barbara, California; http//research.microsoft.com/en-us/um/people/awilson/publications/HarrisonUIST2011/HarrisonUIST2011.html.

Hartmann, Bjorn et al; Pictionaire: Supporting Collaborative Design Work by Integrating Physical and Digital Artifacts; CSCW 2010; Feb. 6, 2010; Savannah, Georgia; http//research.microsoft.com/en-us/um/people/awilson/publications/HartmannCSCW2010/HartmannCSCW2010.html.

Hinckley, Ken et al; Pen+ Touch =New Tools; USTI'10; Oct. 3, 2010; New York, New York; http://research.microsoft.com/en-us/um/people/awilson/publications/HinckleyUIST2010/HinckleyUIST2010.html.

Izadi, Shahram et al; C-Slate: A Multi-Touch and Object Recognition System for Remote Collaboration Using Horizontal Surfaces; IEEE; 2007; http://research.microsoft.com/pubs/132551/cslate1.pdf.

Junuzovic, Sasa et al; Microsoft Research-IllumiShare; Microsoft Research; 2012; http://delivery.acm.org/10.1145/2210000/2208333/p1919-junuzovic.pdf?p=15.219.153.76&id=2208333&acc=ACTIVE%20SERVICE&key=C2716FEBFA981EF153FE223D54A46A411F9E1F05F1DA6F38&CFID=271558808&CFTOKEN=96334302&_acm_=1387226323_00af7aa5e159c7c67d724c49ef01bacf.

Kane, Shaun K. et al; Bonfire: A Nomadic System for Hybrid Laptop-Tabletop Interaction; UIST'09: Oct. 4, 2009; Victoria, British Columbia, Canada; http://dub.washington.edu/djangosite/media/papers/uist09.pdf.

Linder, Natan et al; LuminAR: Portable Robotic Augmented Reality Interface Design and Prototype; UIST'10, Oct. 3, 2010; New York, New York; http://fluid.media.mit.edu/sites/default/files/2010-10-03-luminar_uist10_demo.pdf.

Melanson, Donald; Microsoft Research Working on Portable Surface; Mar. 2, 2010; http://www.engadget.com/2010/03/02/microsoft-research-working-on-portable-surface/.

Melanson, Donald; Wiimote Repurposed for Multi-Point Interactive Whiteboard; Dec. 10, 2007; http://www.engadget.com/2007/12/10/wimote-repurposed-for-multi-point-interactive-whiteboard/.

Simonite, Tom; A Kitchen Countertop With a Brain; MIT Technology Review; Jul. 2, 2010; http://www.technologyreview.com/news/419639/a-kitchen-countertop-with-a-brain/.

Wilson, Andrew D. et al; Combining Multiple Depth Cameras and Projectors for Interactions On, Above, and Between Surfaces; UIST'10; Oct. 3, 2010; New York, New York; http://research.microsoft.com/en-us/um/people/awilson/pubications/WilsonUIST2010/WilsonUIST2010/WilsonUIST2010.html.

Wilson, Andrew D.; Using a Depth Camera as a Touch Sensor; ITS 2010; Devices & Algorithms; Nov. 7, 2010; Saarbrucken, Germany; http://research.microsoft.com/en-us/um/people/awilson/publications/WilsonITS2010/WilsonITS2010.html.

* cited by examiner

NON-UNIFORM CORRECTION ILLUMINATION PATTERN

BACKGROUND

When using a camera to take a photograph, there must be sufficient lighting. Some cameras have built-in flashes while other cameras use external lighting sources. Insufficient lighting can render the resulting photograph less than desirable.

BRIEF DESCRIPTION OF THE DRAWINGS

For a detailed description of various examples, reference will now be made to the accompanying drawings in which.

DETAILED DESCRIPTION

Figure 1A:
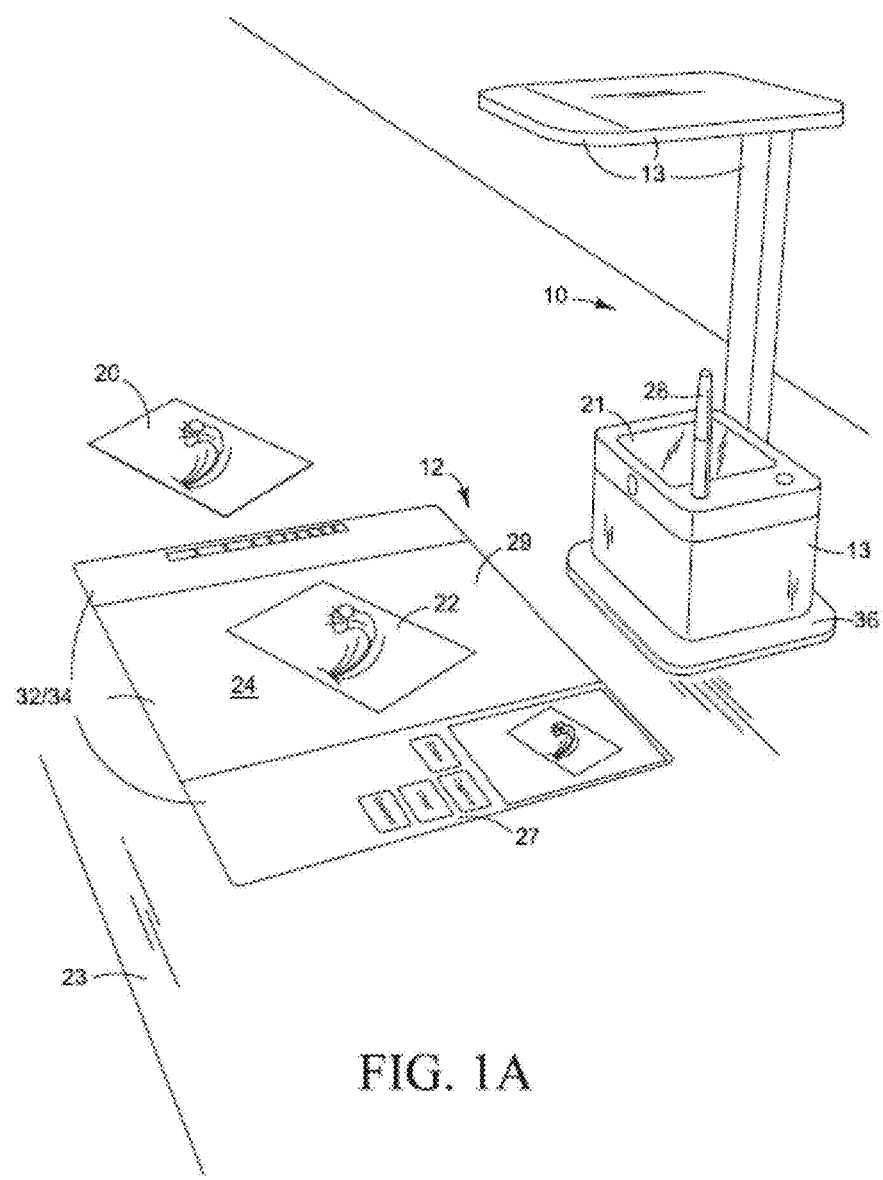
FIGS. 1A and 1B are perspective, exterior views illustrating one example of a projection capture system.

Overview:

A mixed reality system is one in which a projector is used to project an image on a work surface while one or more cameras may be present to monitor and detect objects placed on or around the work surface by a user. In one mode of usage, a user can view an image (e.g., a document, a photograph, a video, etc.) projected onto the work surface by the projector and then desire to take a digital photograph of an object placed on the work surface. The object could be, for example, a photograph or a three dimensional (3D) object. References to taking a digital photograph, capturing an image, and acquiring an image are synonymous. When using one of the system's built-in cameras, the projector's mode of operation changes from displaying an image (document, photograph, video, etc.) to illuminating the work surface so as to use the projector as a lighting source for the camera. As soon as the image has been acquired by the camera, the projector reverts back to displaying the original image. The projector thus functions as a "flash" for the camera during image capture.

If the illumination source (the projector) is configured to project a completely uniform illumination pattern, the light pattern received by the camera after the uniform illumination pattern reflects off of the work surface and object(s) located thereon may be non-uniform due to various irregularities such as project lens non-uniformity and geometric non-uniformities resulting from the angle and distance traveled by the light rays to reach the work surface. The resulting image of the object as captured by the camera may look different depending on where on the work surface the user places the object. This problem is addressed as described below by calibrating the system to compute a non-uniform correction illumination pattern. In general, a uniform illumination pattern is solid white. That is, each output illumination pixel of the uniform illumination pattern is the same as all other pixels in the image. In some implementations, the output illumination pixels are each set to an individually predetermined output intensity.

During the calibration process, the system described below captures an image of a blank work surface using a uniform illumination pattern. A blank work surface is a work surface with no objects (e.g., photographs, documents, etc.) placed thereon and no image projected onto it by the projector. The resulting captured image then may be inverted to produce a non-uniform correction illumination pattern. The non-uniform correction illumination pattern subsequently may be used as the projected illumination pattern during image acquisition. The non-uniform correction illumination pattern is computed in such a way that the irregularities noted above cause the light reflected off the work surface into the camera's lens to generally be uniform.

The illustrative system described below includes a projector that projects an image onto a surface by way of a reflecting mirror. Other suitable implementations include a direct projector, that is, a projector that projects light and an image directly onto the viewing surface rather than by way of a reflecting mirror. Further still, the camera described may be a component of a communication device such as a smart phone. Moreover, in some implementations, the system may be part an all-in-one computer that comprises, among other things, a camera, a projector, and a display. The following description pertains to one implementation but other implementations are possible as well.

EXAMPLE EMBODIMENTS

Figure 1B:
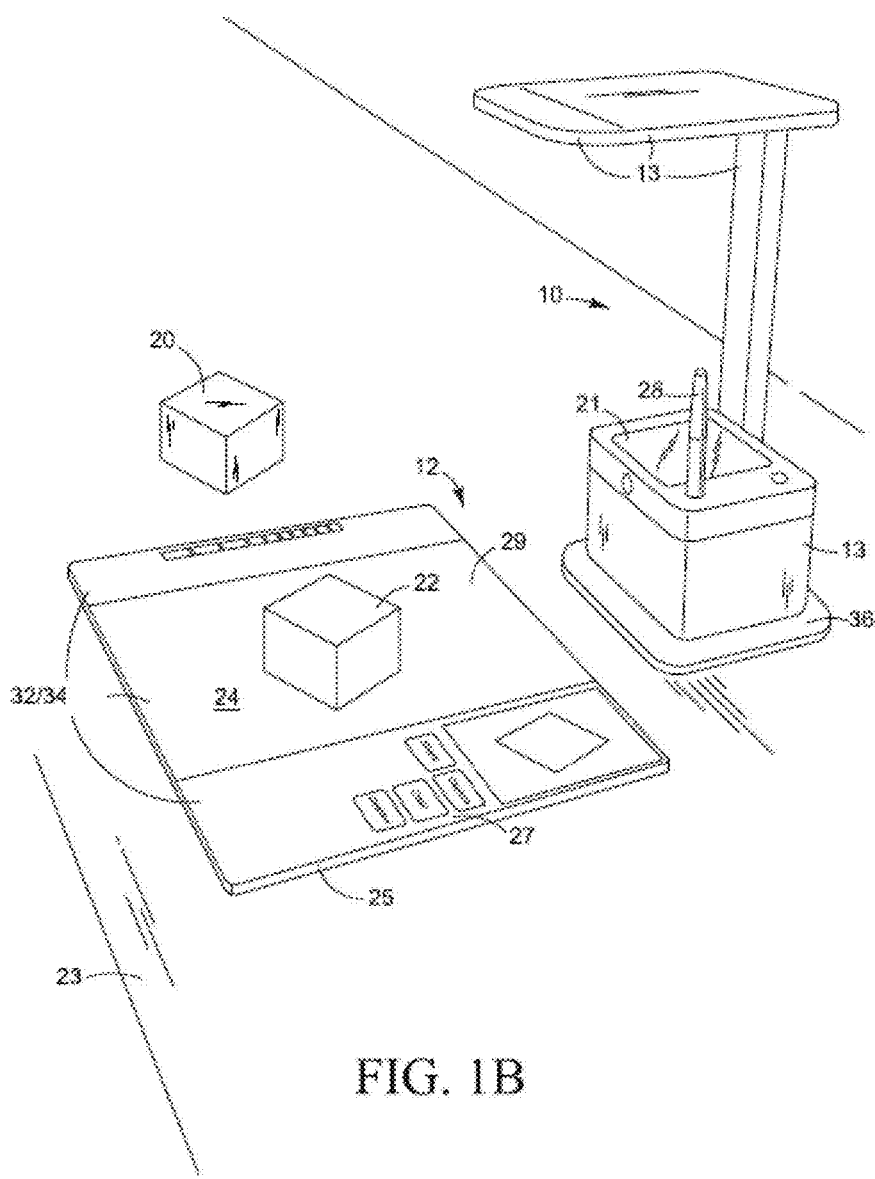
Figure 2:
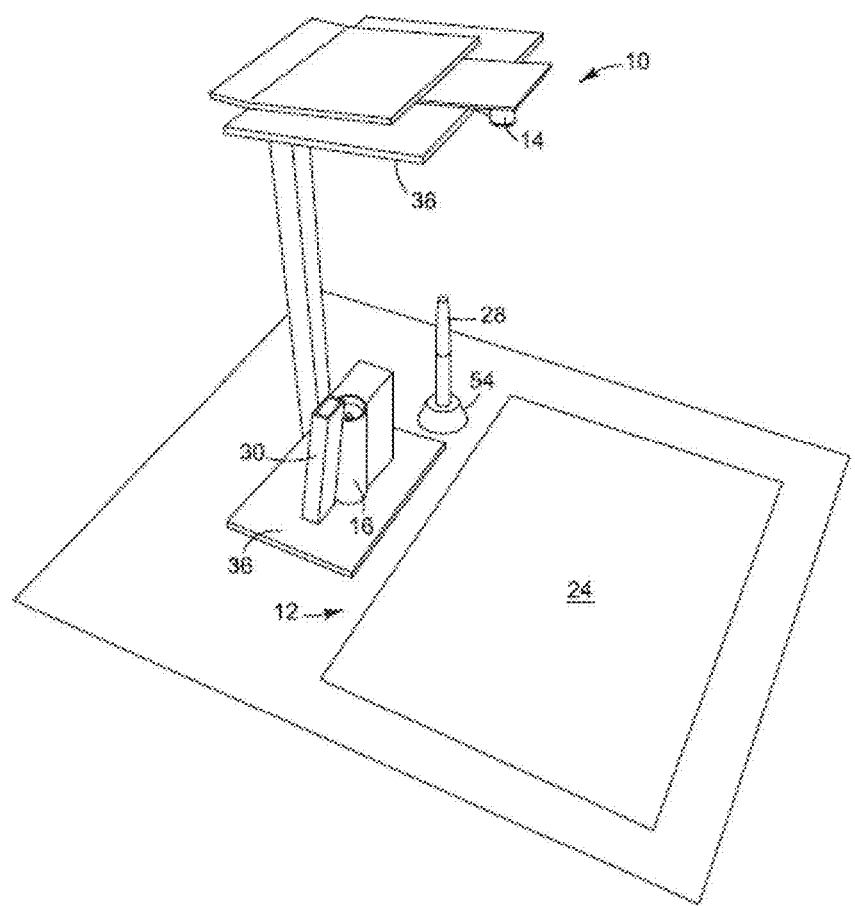
FIG. 2 is a perspective, interior view illustrating one example of a projection capture system.

FIGS. 1A and 1B are perspective, exterior views illustrating one example of a projection capture system 10 and an interactive workspace 12 associated with system 10. FIG. 2 is a perspective view illustrating one example of a projection capture system 10 with exterior housing 13 removed. Referring to FIGS. 1A, 1B, and 2, projection capture system 10 includes a digital camera 14 and a projector 16. Camera 14 is usable, for example to capture an image of an object 20 in workspace 12 and projector 16 may be used to project an object image 22 into workspace 12. Camera 14 may be a color camera. In some examples, camera 14 is usable to capture an image of the projected object image 22. The lower part of housing 13 includes a transparent window 21 over projector 16 (and infrared camera 30).

In the example shown in FIG. 1A, a two dimensional object 20 (e.g., a hardcopy of a photograph) placed onto a work surface 24 in workspace 12 has been photographed by camera 14 (FIG. 2). Object 20 is shown removed to the side of workspace 12, and object image 22 is projected onto the work surface 24. The object image 22 itself can be photographed by camera 14 (FIG. 2) and/or otherwise manipulated by a user and re-projected into workspace 12. In the example shown in FIG. 1B, a three dimensional object 20 (a cube) placed onto work surface 24 has been photographed by camera 14 (FIG. 2) and then removed to the side of workspace 12. An object image 22 is projected into workspace 12 where the object image can be photographed by camera 12 and/or otherwise manipulated by a user and re-projected into workspace 12.

In one example implementation for system 10, projector 16 is configured to project object image 22 into the same position in workspace 24 as the position of object 20 when its image was captured by camera 14. Thus, a one-to-one scale digital duplicate object image 22 of an object 20 can be projected over the original allowing a digital duplicate in its place to be manipulated, moved, and otherwise altered as desired by a local user or by multiple remote users collaborating in the same projected workspace 12. The projected image can also be shifted away from the original, allowing a user to work with the original and the duplicate together in the same workspace 12.

In FIG. 1A, work surface 24 is part of a desktop or other underlying support structure 23. In FIG. 1B, work surface 24 is on a portable mat 25 that may include touch sensitive areas. In FIG. 1A, for example, a user control panel 27 is projected on to work surface 24 while in FIG. 1B control panel 27 may be embedded in a touch sensitive area of mat 25. Similarly, an A4, letter or other standard size document placement area 29 may be projected onto work surface 24 in FIG. 1A or printed on a mat 25 in FIG. 1B. Other configurations for work surface 24 are possible as well. For example, it may be desirable in some applications for system 10 to use an otherwise blank mat 25 to control the color, texture, or other characteristics of work surface 24, and thus control panel 27 and document placement area 29 may be projected onto the blank mat 25 in FIG. 1B just as they are projected on to the desktop 23 in FIG. 1A.

Figure 3:
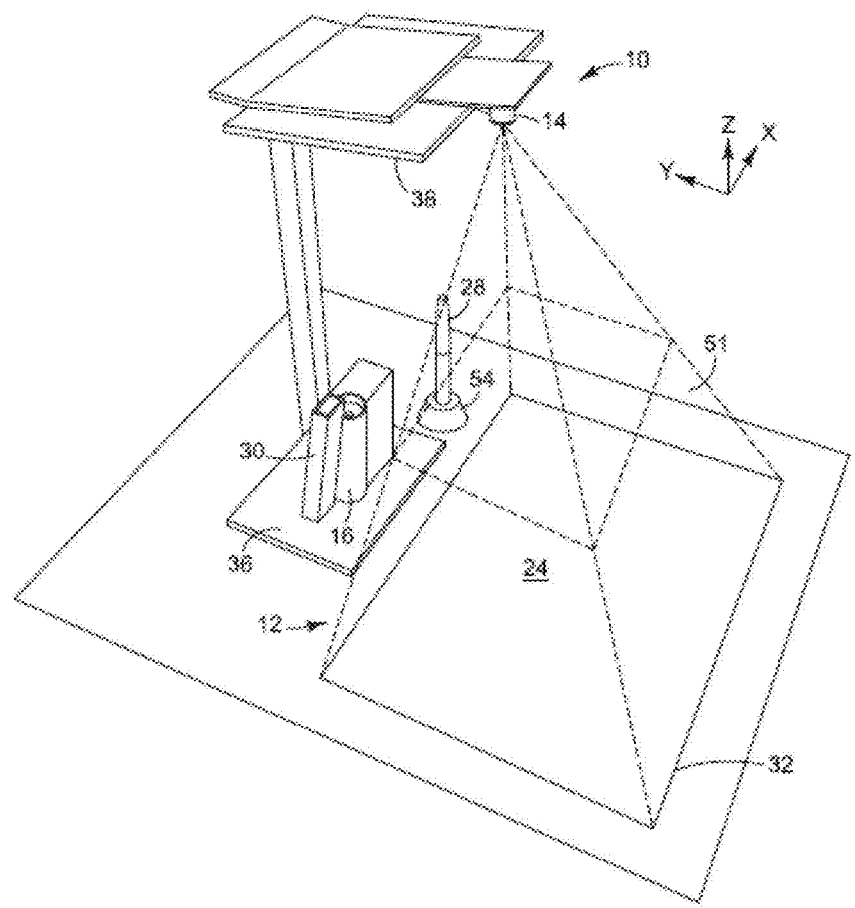
FIG. 3 illustrates one example of the camera in the projection capture system.
Figure 4:
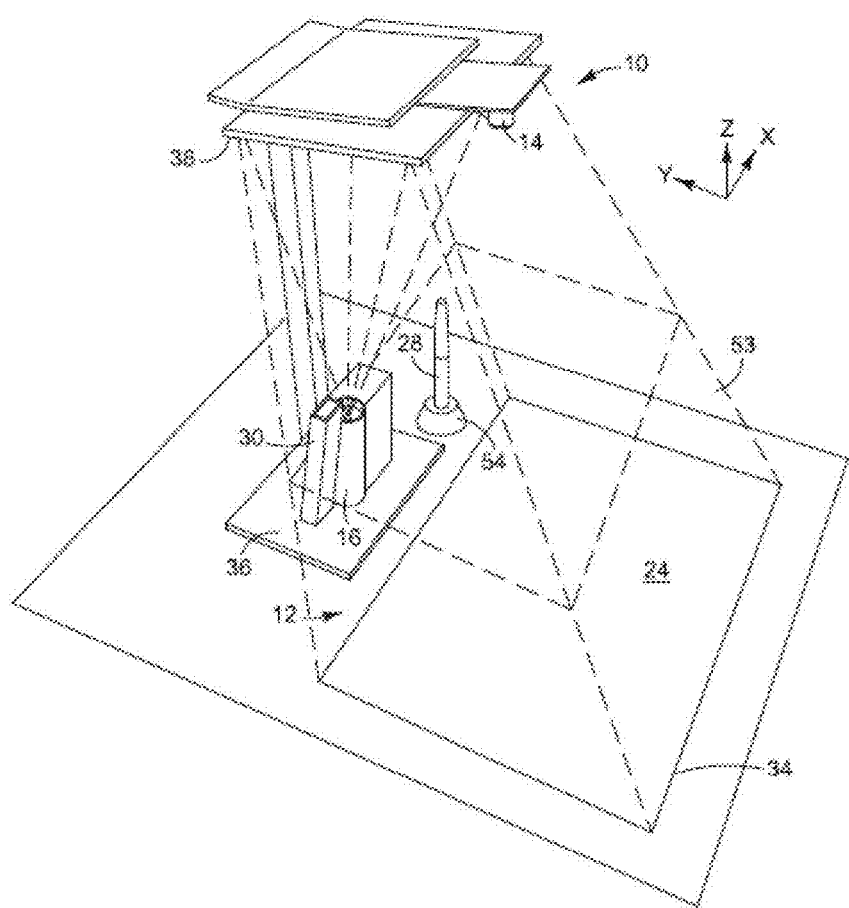
FIG. 4 illustrates one example of the projector in the projection capture system.

In the examples shown in FIGS. 1-2, system 10 includes an infrared digital stylus 28 and an infrared camera 30 for detecting stylus 28 in workspace 12. The stylus 28 may be battery-operated and rest, when not in use in stylus charging dock 54 (FIGS. 2-4). The stylus 28 may include an infrared light, a touch sensitive nib switch to turn on and off the infrared light automatically based on touch, and a manual on/off switch to manually turn the infrared light on and off. The infrared light may be positioned, for example, at or near the tip of the stylus. Infrared light from the stylus reflects off of mirror 38 and is received and detected by infrared camera 30 (FIGS. 2-4). Infrared camera 30 is used to track movement of the stylus 28, thereby permitting the user to move the stylus about on the work surface while system 10 tracks its movement. The stylus can thus be used as a pointing device (similar to a mouse), a writing instrument, a drawing instrument, etc.

Although any suitable user input device may be used, a digital stylus (stylus 28) has the advantage of allowing input in three dimensions, including along work surface 24 and without a sensing pad or other special surface. Thus, system 10 can be used on a greater variety of work surfaces 24. Also, the usually horizontal orientation of work surface 24 makes it useful for many common tasks. The ability to use traditional writing instruments on work surface 24 is advantageous over vertical or mobile computing interfaces. Projecting an interactive display on to a working desktop mixes computing tasks with the standard objects that may exist on a real desktop. Thus physical objects can coexist with projected objects. As such, the comfort of using real writing instruments as well as their digital counterparts (like stylus 28) is an effective use model. A three-dimensional pad-free digital stylus enables annotation on top of or next to physical objects without having a sensing pad get in the way of using traditional instruments on work surface 24.

Referring to FIGS. 1-4, projector 16 is positioned near base 36 outside projector display area 34 (FIG. 4) and focused on mirror 38 so that light from projector 16 is reflected off mirror 38 and onto workspace 12. Projector 16 and mirror 38 define a three dimensional display space 53 in workspace 12 within which projector 16 can effectively display images. Projector display space 53 overlaps camera capture space 51 (FIGS. 3-4) and is bounded in the X and Y dimensions by display area 34 on work surface 24.

Projector 16 may include any suitable light projector. In one example, the projector may be a liquid crystal on silicon (LCOS) projector or a digital light processing projector which is advantageously compact and power efficient. Projector 16 may also employ a shift lens to allow for complete optical keystone correction in the projected image. The use of mirror 38 increases the length of the projector's effective light path, thereby mimicking an overhead placement of projector 16, while still allowing a commercially reasonable height for an integrated, standalone device.

As explained previously, the projector 16 may serve as the light source for camera 14 during image capturing. Camera capture area 32 (FIG. 3) and projector display area 34 (FIG. 4) substantially overlap on work surface 24. Thus, a substantial operating efficiency can be gained using projector 16 both for projecting images and for camera lighting.

Since projector 16 acts as the light source for camera 12 for image capture, the projector light should be bright enough to swamp out any ambient light that might cause defects from specular glare. In some examples, a projector light of 200 lumens or greater may be sufficiently bright to swamp out ambient light for the typical desktop application for system 10. For still image capture and if the projector is based on light emitting diode (LED) technology, the projector's red, green, and blue LED's can be turned on simultaneously for the camera flash to increase light brightness in workspace 12, helping swamp out ambient light and allowing faster shutter speeds and/or smaller apertures to reduce noise in the image.

As explained above, due to various irregularities involved with the projector 16 relative to the work surface 24, a uniform illumination pattern projected by the projector will result in a non-uniform light pattern as received by the camera 14 after being reflected off of work surface 24 thereby potentially causing undesirable image capture quality by camera 14.

In some implementations, the projection capture system may be integrated in or attached to an all-in-one computer, a display, or a tablet device. For example, the projection capture system may be positioned atop a vertical support post that also supports an all-in-one computer (i.e., a display that also houses the computer's system board) or that supports a display. In such implementations, the projection capture system projects directly onto a work surface and/or or touchmat rather than reflecting off of a mirror.

Figure 5:
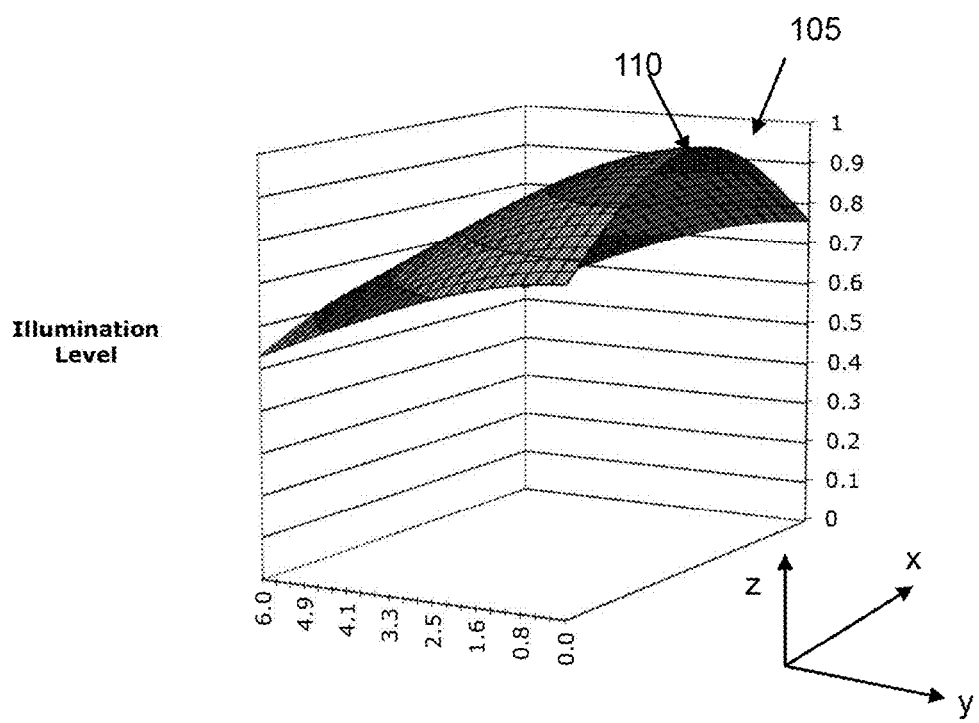
FIG. 5 illustrates an example of a profile an light illumination pattern as received by the camera.

FIG. 5 shows an example of a light pattern 105 as received by camera 14 resulting from a uniform illumination pattern projected initially by projector 16. The light pattern 105 is what is received by the camera 14, and is not the illumination pattern projected by the projector 16. The projector 16, in the example of FIG. 5, projected an illumination pattern that was substantially uniform (i.e., every pixel has a substantially similar illumination level). The received pattern 105 has been normalized to an illumination level between 0 and 1 as indicated by the vertical axis. The example light pattern 105 has a maximum value of approximately 1 as indicated by reference numeral 110. The maximum value at point 110 represents the point in the captured image that has the highest signal reception and may be the closest point to the projector 16. Away from point 110, the illumination level decreases in both the X and Y directions as shown.

Figure 6:
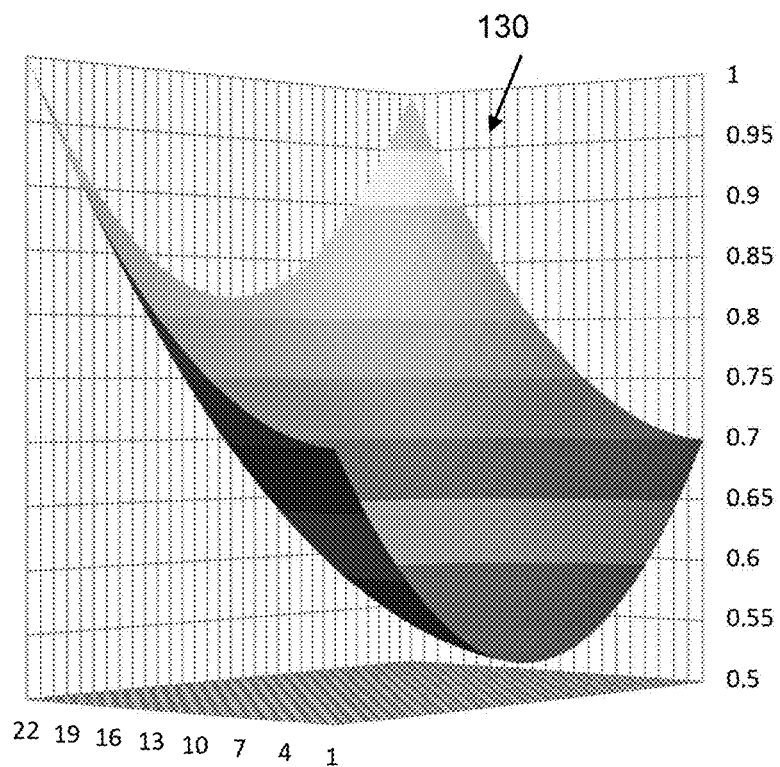
FIG. 6 illustrates an example of non-uniform correction illumination pattern as projected by the projector.

Referring to FIG. 6 and in accordance with the disclosed principles, the system 10 performs a calibration process by which a non-uniform correction illumination pattern 130 is computed. The non-uniform correction illumination pattern 130, such as that shown in the example of FIG. 6, is the pattern that is projected by projector 16 (not the pattern actually received by camera 14). The correction illumination pattern is computed in such a way that upon its reflection off of work surface 24, the light pattern received into the camera 14 is substantially uniform. Because the camera receives a substantially uniform illumination pattern, image capture is improved relative to image capturing that would have resulted with the light pattern of FIG. 5.

Figure 7:
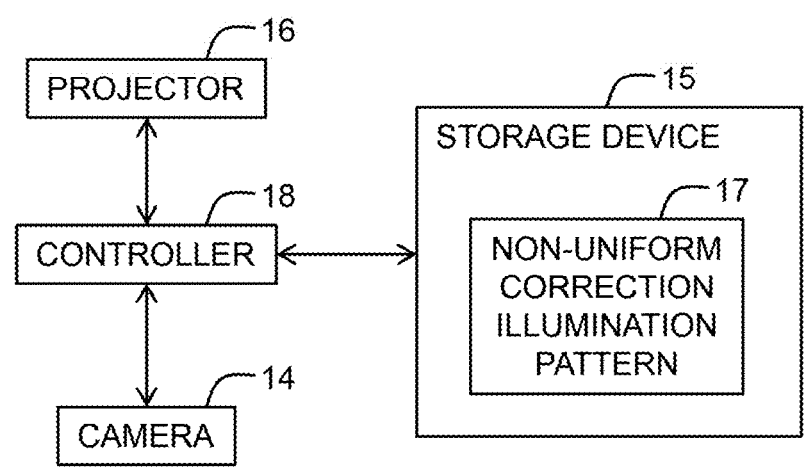
FIG. 7 shows an example of a system diagram of the projection capture system.

The Hardware:

FIG. 7 shows an example in which system 10 includes a controller 18 coupled to the camera 14 and projector 16. A storage device 15 is also provided for storing the non-uniform correction illumination pattern 17 for subsequent use during image capture by camera 14. During image capture, the controller 18 retrieves the non-uniform correction illumination pattern 17 and causes the projector 16 to project the non-uniform correction illumination pattern 17 while camera 14 acquires the image.

Figure 8:
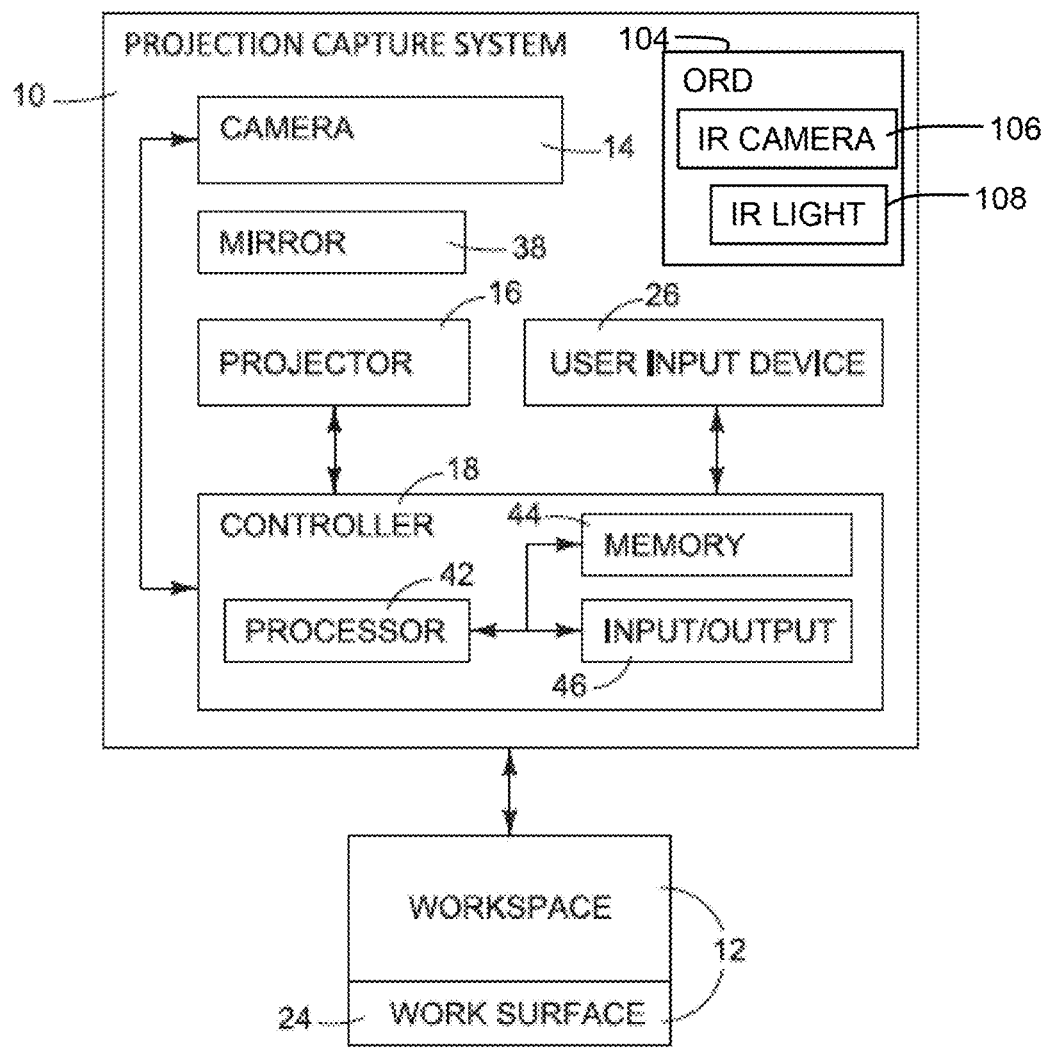
FIG. 8 shows another example of a system diagram of the projection capture system.

FIG. 8 provides additional detail of another example of the projection capture system 10. The projection capture system 10 includes the camera 14, projector 16, and controller 18 as noted above. The system 10 also includes the mirror 38 and a user input device 26. The user input device 26 may include the digital stylus 28. The controller 18 may include a processor 42, memory 44, and an input/output device 46. The memory 44 is any suitable type of non-transitory computer-readable storage device such as volatile storage (e.g., random access memory), non-volatile storage (e.g., hard disk, optical disc, etc.), or combinations of both volatile and non-volatile storage devices. Memory 44 may include code that is executable by processor 42 to implement some or all of the functionality described herein. Thus, any function described herein as attributed to system 10 is implemented or controlled by controller 18 and, more specifically in the example of FIG. 8 is implemented by processor 42 executing software module(s) stored on memory 44. In other implementations of projection capture system 10, the controller 18 with processor 42 may be implemented as a state machine in an application specific integrated circuit (ASIC).

The input/output device 46 may receive information from or send information to an external device. Such information, for example, may be information to be displayed on work surface 24, or acquired images to be transmitted to an external device.

Projection capture system 10 in FIG. 8 may also include an object recognition device (ORD) 104 for distinguishing between real and virtual objects in the workspace. In the example shown, object recognition device 104 includes an infrared camera 106, an infrared light 108, and a depth sensor 109. In some examples, a combination of infrared camera 106, camera 14, and depth sensor 109 may be used to detect the absence of physical objects on the work surface 24. The depth sensor 109 indicates when a 3D object is on the work surface. The infrared camera indicates when a thin object (e.g., photos, paper, etc.) are on the work surface. The camera 14 (which may be a color camera) indicates when the work surface contains color content when the projector projects white. The object recognition device 104 may be used to detect the presence or absent of a real object on work surface 24. This ability is useful in the calibration process described below as the calibration process should be performed without any real objects on the work surface.

The infrared light 108 may be used with camera 106 to illuminate the workspace to improve object recognition. Also, while it may be possible to use the same infrared camera for both object recognition (camera 106) and for sensing an IR stylus (camera 30 in FIGS. 2-4), it is expected that the camera frame rate for object recognition may not need to be as high as the frame rate for sensing stylus position but may require higher resolution. Consequently, it may be desirable for some implementations to use separate infrared cameras for object recognition and stylus sensing.

Calibration Process:

The calibration process for computing the non-uniform correction illumination pattern will now be described. The calibration process may be performed whenever no physical objects are placed on the work surface 24, and no content is being projected by projector 16 onto the work surface, that is, the work surface is blank. A user of system 10 may manually trigger the performance of the calibration process using the digital stylus 28 by selecting a "calibration start" button displayed on the work surface or by other suitable means. Alternatively or additionally, the object recognition device 104 may be used to constantly or periodically detect when the work surface 24 is blanks and when the work surface is determined to be blank, the object recognition device 104 may trigger the controller 18 (e.g., send a signal to the controller) to perform a calibration process. The calibration process thus may be performed multiple times to compute the non-uniform correction illumination pattern. The non-uniform correction illumination pattern may change depending on various factors such as ambient lighting conditions.

Figure 9:
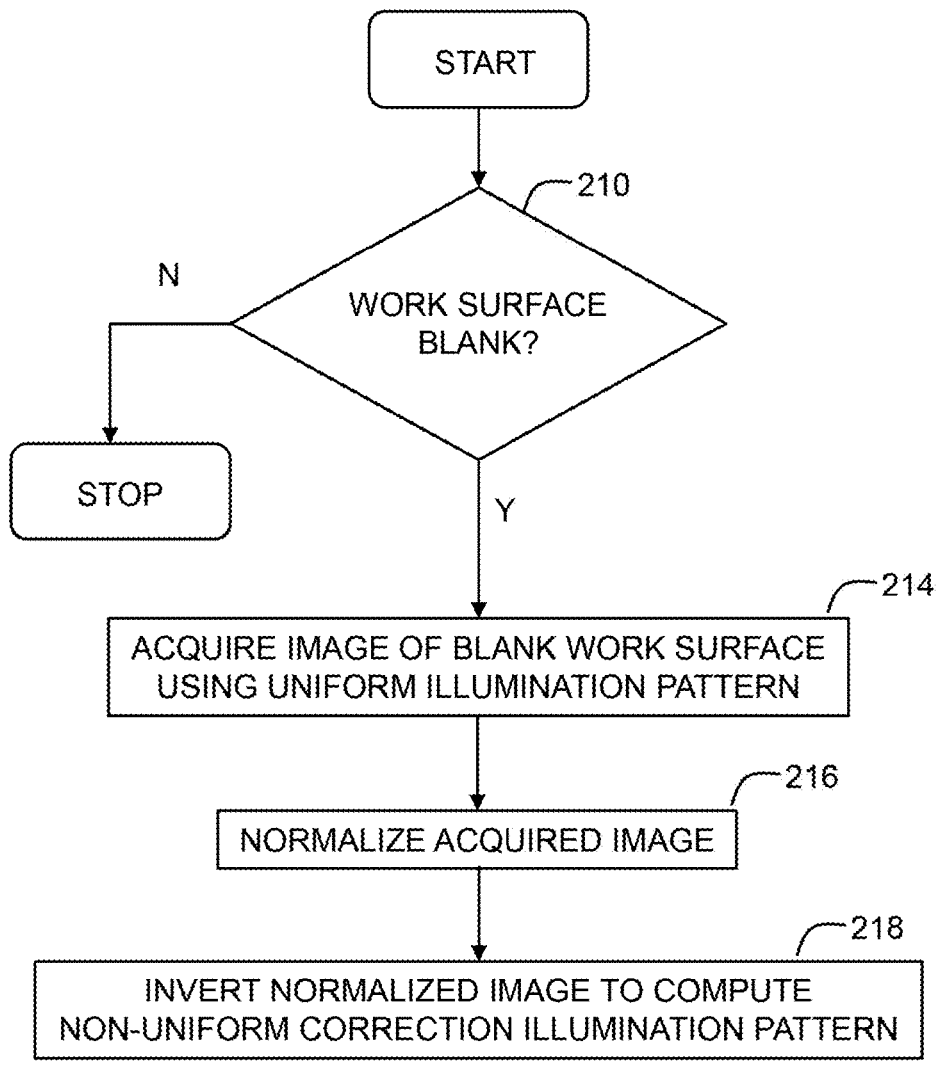
FIG. 9 shows a calibration process for obtaining a non-uniform correction illumination pattern in accordance with an example.

The illustrative calibration process of FIG. 9 may be performed by controller 18. The operations shown may be performed in the order shown or in a different order and two or more of the operations may be performed concurrently rather than serially. Upon determining work surface 24 to be blank (210) as described above using the object recognition device 104, the calibration process includes controller 18 causing the camera 14 to acquire (214) an image of the blank work surface using a uniform illumination pattern. During the image acquisition of the blank work surface, whatever image the projector 16 was otherwise projecting is temporarily suspended and the projector 16 is caused to project the uniform illumination pattern. Due to the irregularities involved in system 10 relative to the work surface 24, the resulting acquired image may have a non-uniform pattern such as that shown in the example of FIG. 5.

At 216, the acquired image is normalized (e.g., placed on a scale of 0 to 1). At 218, the normalized image is inverted to compute the non-uniform correction illumination pattern. In one example, the inversion of the normalized acquired image is computed by subtracting each pixel of the normalized acquired image from 1 (assuming the normalization results in each pixel being in the range of 0 to 1). Once the non-uniform correction illumination pattern is computed, the pattern is saved to memory 44 for subsequent use in acquiring an image by camera 14.

Figure 10:
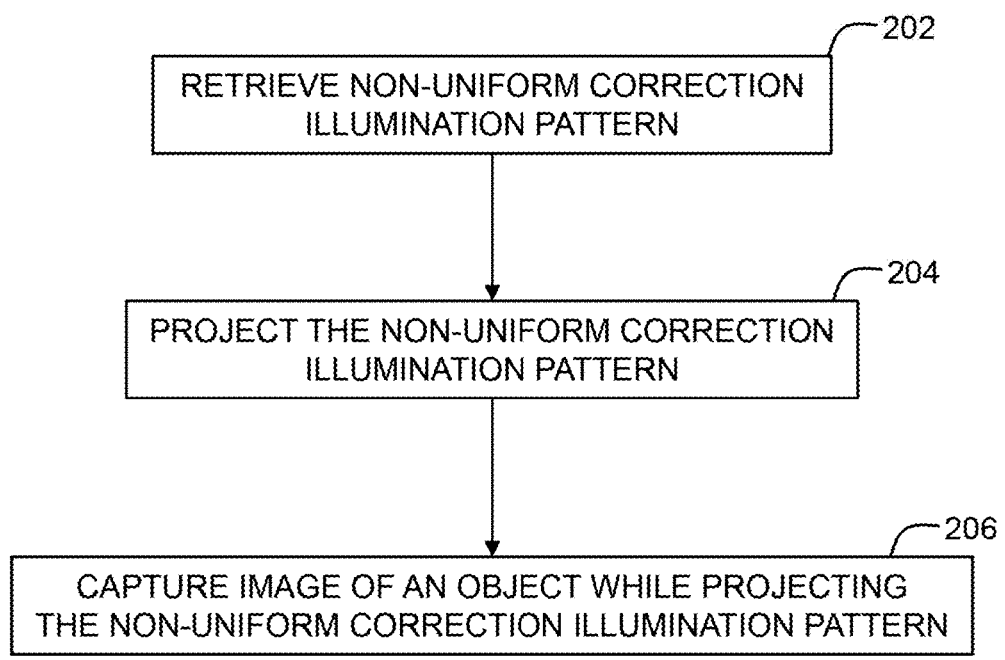
FIG. 10 shows a method of capturing an image using a non-uniform correction illumination pattern in accordance with an example.

Image Acquisition:

FIG. 10 shows an example of a method for using camera 14 to acquire an image using the non-uniform correction illumination pattern. The method may be initiated manually by a user, for example, by a user selecting an "image capture" button displayed on work surface 24 by projector 16.

At 202, the method includes the controller 18 retrieving the non-uniform correction illumination pattern from memory 44. At 204, the method further includes projecting the non-uniform correction illumination pattern. During operation 204, whatever image was already being projected by projector 16, that image's projection is temporarily is suspended in favor of the projection of the non-uniform correction illumination pattern. The image is then captured by camera 14 at 206. Once the image has been captured, the controller may again cause the projector to revert back to projecting whatever image was being projected before image capture occurred.

The above discussion is meant to be illustrative of the principles and various aspects of the present disclosure. Numerous variations and modifications will become apparent to those skilled in the art once the above disclosure is fully appreciated. It is intended that the following claims be interpreted to embrace all such variations and modifications.

What is claimed is:

1. A projection capture system, comprising:
a controller comprising a processor and a non-volatile storage storing code executable by the processor to:
receive an image captured by a camera of an object on a work surface;
cause a projector to project a non-uniform correction illumination pattern onto the work surface during image capture of the object by the camera;
receive an image of a blank work surface captured by the camera during a calibration process; and
determine the non-uniform correction illumination pattern based at least in part on the captured image of the blank work surface.

2. The projection capture system of claim 1, wherein the code is executable by the processor further to determine the non-uniform correction illumination pattern by inverting the captured image of the blank work surface.

3. The projection capture system of claim 1, wherein the code is executable by the processor further to determine the non-uniform correction illumination pattern by normalizing the captured image of the blank work surface to produce a normalized captured image and subtracting each pixel of the normalized captured image from a predetermined value.

4. The projection capture system of claim 1, wherein the code is executable by the processor further to store the non-uniform correction illumination pattern in memory and subsequently to retrieve the non-uniform correction illumination pattern from the memory for projection onto the work surface during the image capture of the object.

5. The projection capture system of claim 1, wherein the code is executable by the processor repeatedly to capture the image of the blank work surface and to store a digital representation of each non-uniform correction illumination pattern in memory.

6. The projection capture system of claim 1 wherein the projection capture system is to attach to at least one of an all-in-one computer and a display.

7. The projection capture system of claim 1 wherein the non-uniform correction illumination pattern comprises a plurality of output illumination pixels being set to an individually predetermined output intensity.

8. A projection capture system, comprising:
a controller;
a projector communicatively coupled to the controller; and
a camera communicatively coupled to the controller to capture an image of an object on a work surface;
wherein the controller is to perform a calibration process in which the controller is to determine that no object is present on a blank work surface, cause the camera to capture an image of the blank work surface using a uniform light source generated by the projector, and generate a non-uniform correction illumination pattern based at least in part on the captured image of the blank work surface.

9. The projection capture system of claim 8, wherein the controller is further to generate the non-uniform correction illumination pattern by inverting the captured image of the blank work surface.

10. The projection capture system of claim 8, wherein the controller is further to generate the non-uniform correction illumination pattern by normalizing the captured image of the blank work surface to produce a normalized captured image and inverting the normalized captured image.

11. The projection capture system of claim 10, wherein the controller is further to invert the normalized captured image by subtracting each pixel of the normalized captured image from a threshold value.

12. The projection capture system of claim 11, wherein the threshold value is 1.

13. The projection capture system of claim 8, further comprising an object recognition device to determine whether an object is present on the work surface.

14. The projection capture system of claim 13, wherein the controller is to perform the calibration process upon the object recognition device determining no object is present on the work surface.

15. The projection capture system of claim 8, wherein the projection capture system is to attach to at least one of an all-in-one computer and a display.

16. A method, comprising:
retrieving a non-uniform correction illumination pattern from a storage device;
projecting, by a projector, said non-uniform correction illumination pattern; and
capturing, by a camera, an image of an object while projecting said non-uniform correction illumination pattern, wherein said non-uniform correction illumination pattern projected by said projector increases uniformity of a light pattern in said captured image of said object as captured by said camera.

17. The method of claim 16, further comprising generating the non-uniform correction illumination pattern by acquiring an image of a blank work surface using a uniform illumination pattern.

18. The method of claim 17, wherein generating the non-uniform correction illumination pattern comprises inverting the image of the blank work surface.

19. The method of claim 17, further comprising determining, using the camera, whether the work surface is blank and acquiring the image of the blank work surface using the uniform illumination pattern in response to determining that the work surface is blank.

* * * * *